United States Patent
Jang et al.

(10) Patent No.: US 11,205,940 B2
(45) Date of Patent: Dec. 21, 2021

(54) SWITCHED RELUCTANCE MOTOR HAVING A HALL SENSOR ASSEMBLY

(71) Applicant: NEW MOTECH CO., LTD., Gwangju (KR)

(72) Inventors: Jeong Cheol Jang, Gwangju (KR); Gyeong Sik Yang, Gwangju (KR); Nam Youn Kim, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 32 days.

(21) Appl. No.: 16/649,664

(22) PCT Filed: Sep. 28, 2018

(86) PCT No.: PCT/KR2018/011571
§ 371 (c)(1),
(2) Date: Mar. 23, 2020

(87) PCT Pub. No.: WO2019/112157
PCT Pub. Date: Jun. 13, 2019

(65) Prior Publication Data
US 2020/0321834 A1  Oct. 8, 2020

(30) Foreign Application Priority Data
Dec. 6, 2017  (KR) .......................... 10-2017-0166352

(51) Int. Cl.
*H02K 11/215* (2016.01)
*H02K 5/10* (2006.01)
(Continued)

(52) U.S. Cl.
CPC ............. *H02K 11/215* (2016.01); *H02K 5/10* (2013.01); *H02K 19/06* (2013.01); *H02K 29/08* (2013.01)

(58) Field of Classification Search
CPC .... H02K 5/10; H02K 11/0094; H02K 11/215; H02K 19/06; H02K 29/08
(Continued)

(56) References Cited

U.S. PATENT DOCUMENTS

| | | | |
|---|---|---|---|
| 7,589,443 B2 * | 9/2009 | Kataoka ............... | H02K 11/215 310/68 B |
| 8,237,318 B2 * | 8/2012 | Ikitake ................. | H02K 11/215 310/68 B |

(Continued)

FOREIGN PATENT DOCUMENTS

| | | |
|---|---|---|
| CN | 103868534 A | 6/2014 |
| JP | 2014-121254 A | 6/2014 |

(Continued)

OTHER PUBLICATIONS

International Search Report for PCT/KR2018/011571 dated Apr. 1, 2019 from Korean Intellectual Property Office.

*Primary Examiner* — Tulsidas C Patel
*Assistant Examiner* — Rashad H Johnson
(74) *Attorney, Agent, or Firm* — Revolution IP, PLLC (57) ABSTRACT

A switched reluctance motor includes an upper housing; a stator assembly including a stator core coupled to the upper housing; a rotor assembly located inside the stator assembly and comprising a rotor core rotating together with a shaft; a lower housing coupled to a lower part of the stator core; a sensor magnet assembly coupled to an upper part of the shaft and rotating together with the shaft; and a hall sensor assembly installed inside the upper housing and installed at one side of the sensor magnet assembly.

3 Claims, 7 Drawing Sheets (51) Int. Cl.
*H02K 19/06* (2006.01)
*H02K 29/08* (2006.01)

(58) Field of Classification Search
USPC .................................. 310/40 R, 68 B, 71, 89
See application file for complete search history.

(56) References Cited

U.S. PATENT DOCUMENTS

| | | | |
|---|---|---|---|
| 9,825,563 B2* | 11/2017 | Estrada | F04B 43/02 |
| 2009/0236951 A1 | 9/2009 | Yoo et al. | |
| 2013/0020916 A1* | 1/2013 | Kim | G01D 5/142 |
| | | | 310/68 B |
| 2013/0076177 A1 | 3/2013 | Seok | |
| 2013/0082548 A1 | 4/2013 | Kim et al. | |
| 2013/0175904 A1 | 7/2013 | Jang et al. | |
| 2015/0180301 A1* | 6/2015 | Kajiyama | H02K 5/15 |
| | | | 310/89 |
| 2018/0198390 A1* | 7/2018 | Oya | H02P 6/30 |

FOREIGN PATENT DOCUMENTS

| | | |
|---|---|---|
| KR | 10-1367054 B1 | 2/2014 |
| KR | 10-1367064 B1 | 2/2014 |
| WO | 2015-073658 A1 | 5/2015 |

* cited by examiner

SWITCHED RELUCTANCE MOTOR HAVING A HALL SENSOR ASSEMBLY

TECHNICAL FIELD

The present invention relates to a switched reluctance motor. More specifically, the present invention relates to a switched reluctance motor capable of controlling the motor stably through a new coupling structure of a sensor magnet detecting the rotation of a rotor.

BACKGROUND ART

In general, a switched reluctance motor (SRM) generates a rotating torque by interrupting the power supplied to a coil wound around a stator core through a switching element. As an input pulse signal is applied to the switching element, the excitation state between the rotor and the stator may vary sequentially, thereby generating a forward rotating torque corresponding to the input pulse signal in the rotor by a magnetic attractive force. Also, it is possible to provide various driving controls such as stopping the rotor at a predetermined location when a specific excitation state is not variable, and generating a reverse torque by controlling the phase of the input pulse signal applied to the switching element starting from the maximum inductance shape. Therefore, the switched reluctance motor is widely used in household electric appliances, such as vacuum cleaners, washing machines, etc., which require control in various directions.

For such switched reluctance motors, the location of the rotor must be detected in order to vary the excitation state of each phase sequentially. Conventionally, when a disc-shaped sensor plate coupled to a rotation shaft rotates, the sensor detects the shape of the peak and valley formed on the sensor plate to detect the location of the rotor. Such sensor plate method had problems of degrading the accuracy of sensing due to the dust, etc. breaking in from the outside.

In this regard, Chinese Patent Publication No. 103868534 solves the problem of the conventional sensor plate by coupling a sensor magnet to an end of a rotation shaft, so that a sensor is located to face the sensor magnet rotating together when the shaft rotates. However, in the prior art, the sensor magnet is installed at an outer side of a case, and the sensor is also installed to be supported by a supporting member formed at an outer side of the case. Accordingly, since the sensor is exposed to the outside, the sensor is exposed to moisture permeating from the outside, or the sensor is not installed to be stably supported, thereby causing poor sensing.

Korean Patent No. 10-1367064 discloses a structure in which a hall sensor is fixed on a printed circuit board and placed on a lower part of a sensor magnet. However, since the printed circuit board is coupled at an end of an insulator of a stator assembly, and the shaft penetrates therethrough in the center, the exact location of the hall sensor cannot be secured by the flexibility of the printed circuit board. Therefore, the sensing becomes less accurate, and the hall sensor exposed to the air is vulnerable to moisture permeated from the outside.

Accordingly, the present inventors intend to suggest a switched reluctance motor of a new structure which may solve the above problems.

DISCLOSURE OF INVENTION

Technical Problem

It is an object of the present invention to provide a switched reluctance motor which improves reliability of detecting the location of a rotor by providing a stable location of a hall sensor assembly.

It is another object of the present invention to provide a switched reluctance motor which can prevent moisture from permeating into a hall sensor to improve reliability and durability of detecting the location of a rotor.

The above objects of the present invention or other inherent objects could all be easily achieved by the present invention explained in the following.

Solution to Problem

The switched reluctance motor according to the present invention comprises an upper housing 11; a stator assembly 20 comprising a stator core 21 coupled to the upper housing; a rotor assembly 30 located inside the stator assembly 20 and comprising a rotor core 31 rotating together with a shaft 32; a lower housing 12 coupled to a lower part of the stator core 21; a sensor magnet assembly 40 coupled to an upper part of the shaft 32 and rotating together with the shaft; and a hall sensor assembly 50 installed inside the upper housing 11 and installed at one side of the sensor magnet assembly 40.

In the present invention, the sensor magnet assembly 40 may comprise a mold cover 41 having a shaft coupling part 41a coupled to the shaft 32; and a ring magnet 42 received in the mold cover 41.

In the present invention, preferably, on the outer circumferential surface of the mold cover 41, the ring magnet 42 is formed in an axial longitudinal direction to be exposed to the outside, and a plurality of L-shaped open parts 41b formed to be extended to the lower surface of the mold cover 41 is formed.

In the present invention, the hall sensor assembly 50 comprises a hall sensor case 51 receiving a printed circuit board 52, and a hall IC 52a installed in the printed circuit board 52 may be inserted in the hall IC insertion part 51a formed to protrude to a lower part of the hall sensor case 51, and the hall IC insertion part 51a may be located at one side of the sensor magnet assembly 40.

In the present invention, preferably, the printed circuit board 52 received in the hall sensor case 51 is sealed by a sealing material 54.

Advantageous Effects of Invention

The present invention has an effect of providing a switched reluctance motor which can improve reliability of detecting the location of a rotor by providing a stable location of a hall sensor assembly, and prevent moisture from permeating into the hall sensor to improve reliability and durability of detecting the location of the rotor.

Hereinafter, the present invention will be explained in more detail with reference to the accompanied drawings.

MODE FOR THE INVENTION

Figure 1:
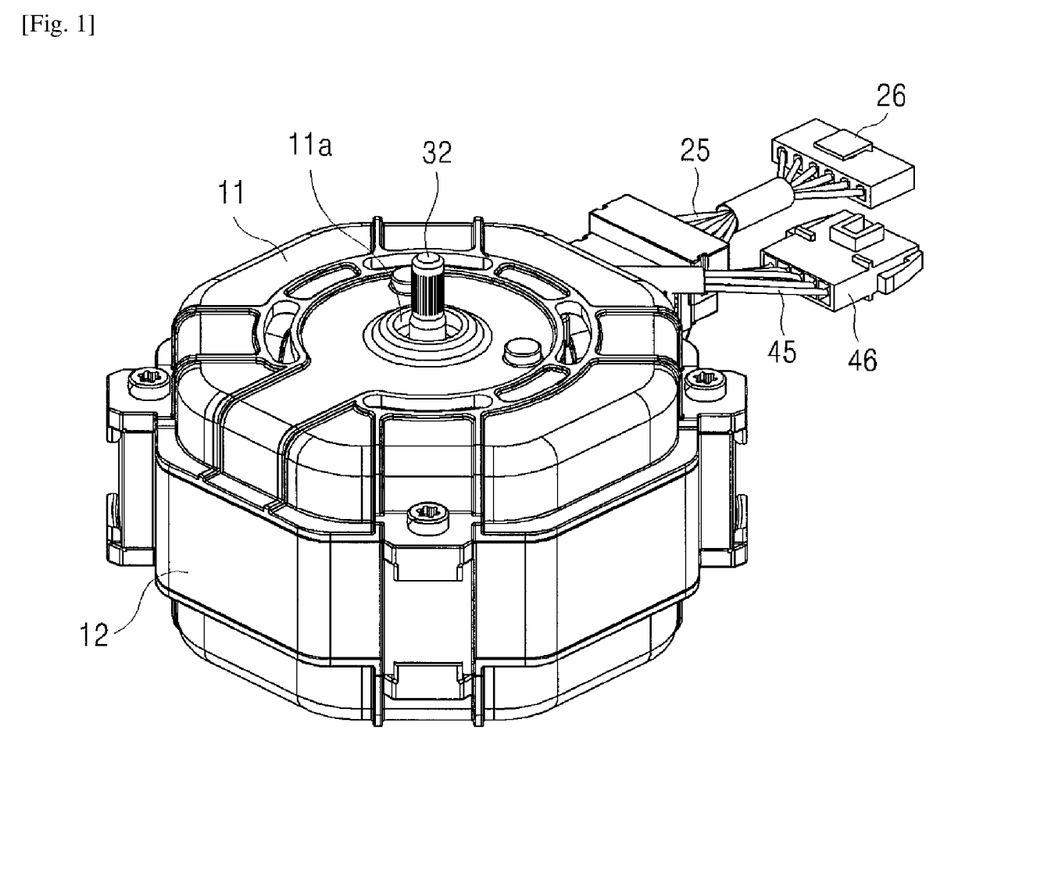
FIG. 1 is a perspective view illustrating the switched reluctance motor according to the present invention.
Figure 2:
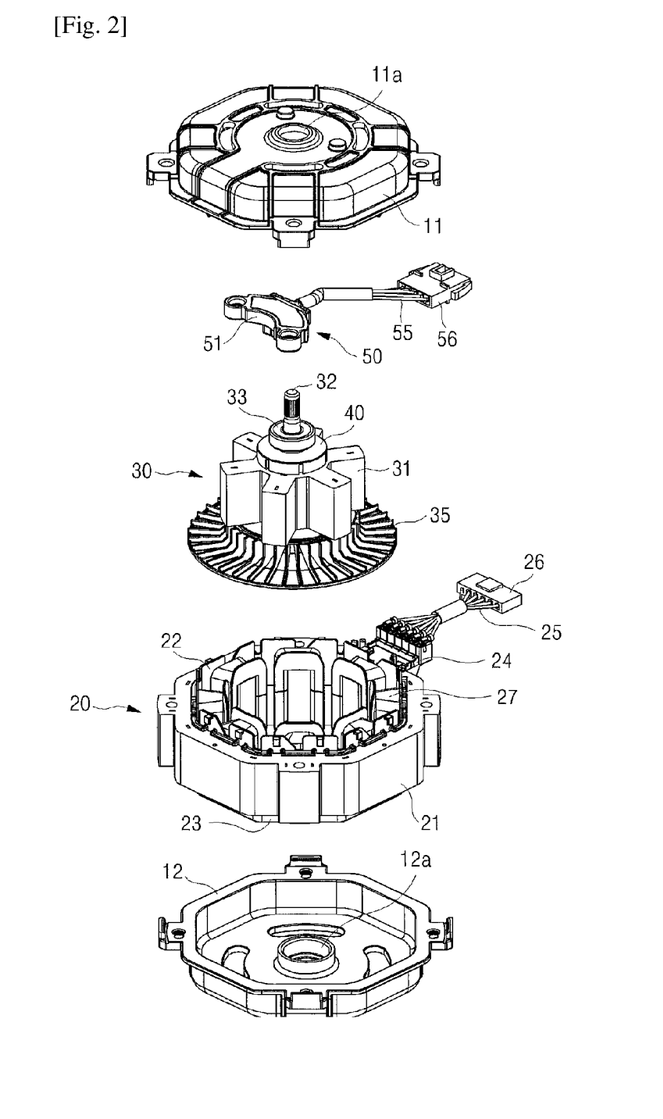
FIG. 2 is an exploded perspective view illustrating the switched reluctance motor according to the present invention.

FIG. 1 is a perspective view illustrating the switched reluctance motor according to the present invention. FIG. 2 is an exploded perspective view of the same.

As illustrated in FIG. 1 and FIG. 2, the switched reluctance motor according to the present invention comprises an upper housing 11, a stator assembly 20, a rotor assembly 30, a sensor magnet assembly 40, and a hall sensor assembly 50.

A shaft penetrating hole 11a through which a shaft penetrates is formed in the center of the upper housing 11. The stator assembly 20 comprises a stator core 21, an upper insulator 22, a lower insulator 23, a power lead wire withdrawal part 24, a power lead wire 25, a power connector 26 and a coil 27.

The stator core 21 is made by laminating thin steel plates. Also, the stator core 21 has a plurality of teeth inwardly protruding. The upper insulator 22 is coupled to an upper part of the teeth and the lower insulator 23 is coupled to a lower part of the teeth. Preferably, the upper and lower insulators 22 and 23 are made of an insulating plastic material in order to insulate the coil 27 and the stator core part wound around the teeth part of the stator core 21. The upper housing 11 is coupled to an upper part of the stator core 21, and the lower housing 12 is coupled to a lower part of the stator core 21. The upper housing 11, lower housing 12 and stator core 21 may be coupled by bolts, etc., but the coupling method is not necessarily limited to bolt coupling.

The power lead wire withdrawal part 24 is a part applying an external power supply to the coil wound around the teeth part of the stator core 21. It would be preferable to apply ordinary magmate so as to facilitate the wiring between the coil and lead wire. Preferably, the power lead wire withdrawal part 24 is integrally formed with the upper insulator 22. The power lead wire 25 withdrawn from the power lead wire withdrawal part 24 is electrically connected to the power connector 26 to receive an external power supply.

The rotor assembly 30, the sensor magnet assembly 40 and the hall sensor assembly 50 will be explained with reference to other drawings.

Figure 3:
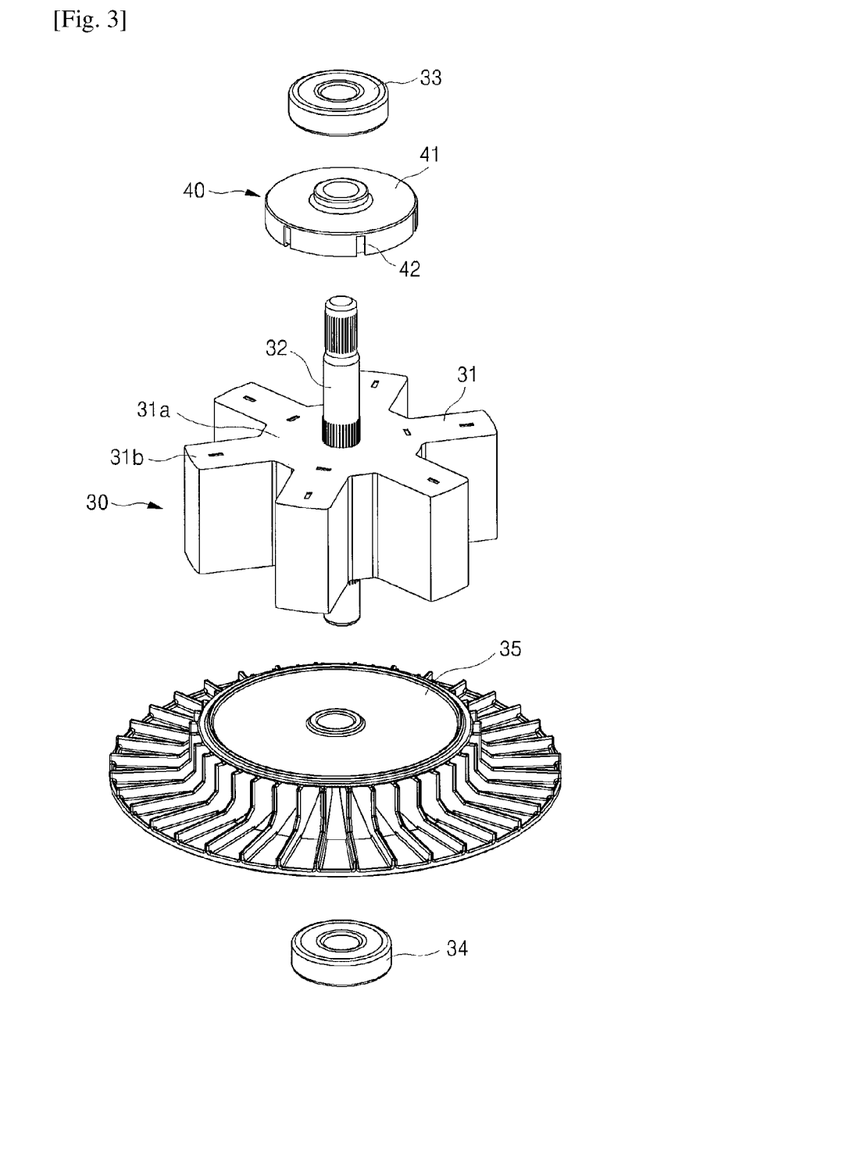
FIG. 3 is an exploded perspective view illustrating the rotor assembly of the switched reluctance motor according to the present invention.

FIG. 3 is an exploded perspective view illustrating the rotor assembly 30 of the switched reluctance motor according to the present invention. Referring to FIG. 2 and FIG. 3 together, the rotor assembly 30 of the present invention comprises the rotor core 31, a shaft 32, an upper bearing 33, a lower bearing 34, and a fan 35.

The rotor core 31 comprises a base (31a) in the center part and a plurality of teeth 31b radially protruding. A shaft 32 is coupled and fixed to the center part of the base 31a, the rotor core 31 rotates together with the shaft 32. FIG. 2 and FIG. 3 illustrate that there are six teeth 31b formed, but the number of teeth is not necessarily limited to six. The upper bearing 33 is coupled to an upper bearing insertion part 11b formed to protrude downwardly from the center part of the inside of the upper housing 11, so as to support the rotation of the shaft at the upper part of the shaft 32. The lower bearing 34 is coupled to a lower bearing insertion part 12a formed to protrude upwardly from the center part of the inside of the lower housing 12, so as to support the rotation of the shaft at the lower part of the shaft 32. The fan 35 is coupled to a lower part of the shaft 32 to be placed inside the lower housing 12. The fan 35 rotates together with the shaft 32 to make the flow of air, thereby playing the role of cooling the heat generated inside the motor.

Meanwhile, the sensor magnet assembly 40 is coupled at an upper part of the rotor core 31 and a lower part of the upper bearing 33 coupled to the shaft 32, and the sensor magnet assembly 40 rotates together with the shaft 32.

Figure 4:
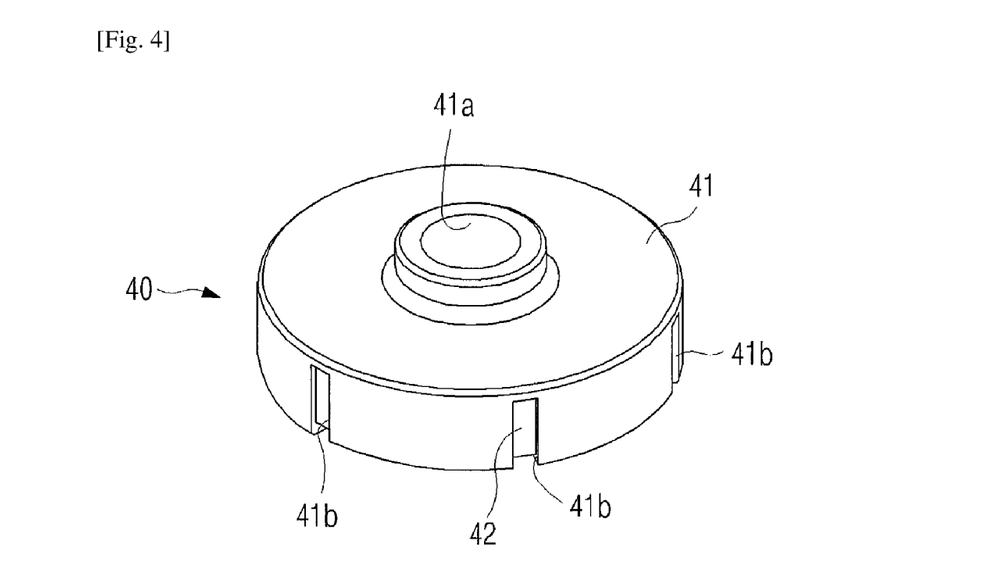
FIG. 4 is a top perspective view illustrating the sensor magnet assembly of the switched reluctance motor according to the present invention.
Figure 5:
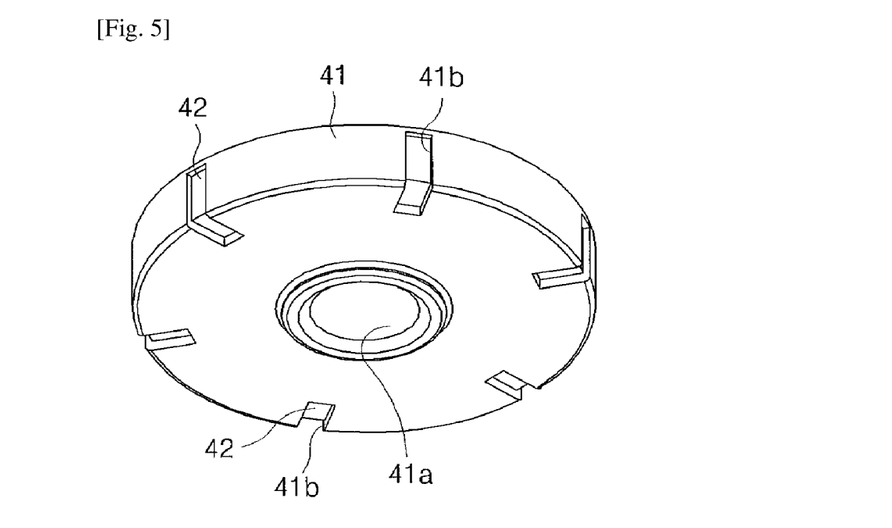
FIG. 5 is a bottom perspective view illustrating the sensor magnet assembly of the switched reluctance motor according to the present invention.

FIG. 4 is a top perspective view illustrating the sensor magnet assembly 40 of the switched reluctance motor according to the present invention. FIG. 5 is a bottom perspective view illustrating the sensor magnet assembly of the switched reluctance motor according to the present invention.

Referring to FIG. 4 and FIG. 5 together, the sensor magnet assembly 40 of the present invention comprises a mold cover 41 and a ring magnet 42. Preferably, the mold cover 41 is manufactured by an insert injection molding method by placing the shaft 32 and the ring magnet 42 in the insertion mold, but the manufacturing method is not necessarily limited thereto. A shaft coupling part 41a, which is a part through which a shaft 32 is penetrated and fixed, is formed in the center part of the mold cover 41.

On the outer circumferential surface of the mold cover 41, a plurality of L-shaped open parts 41b is formed. While being formed in the longitudinal direction on the outer circumferential surface of the mold cover 41, the L-shaped open part 41b is extended to the bottom surface of the mold cover 41 so as to form the shape of the letter "L." Through the L-shaped open part 41b, the ring magnet 42 is exposed to the outside from the mold cover 41. Through such structure, the exposed part of the ring magnet 42 is extended so that location detection could be performed more accurately at the hall sensor assembly 50 located adjacent to the sensor magnet assembly 40. The number of L-shaped open parts 41b is not particularly limited, but preferably there are two or more L-shaped open parts. The location of the L-shaped open parts 41b is not particularly limited, but preferably the L-shaped open parts are located symmetrically with respect to the shaft 32.

Figure 6:
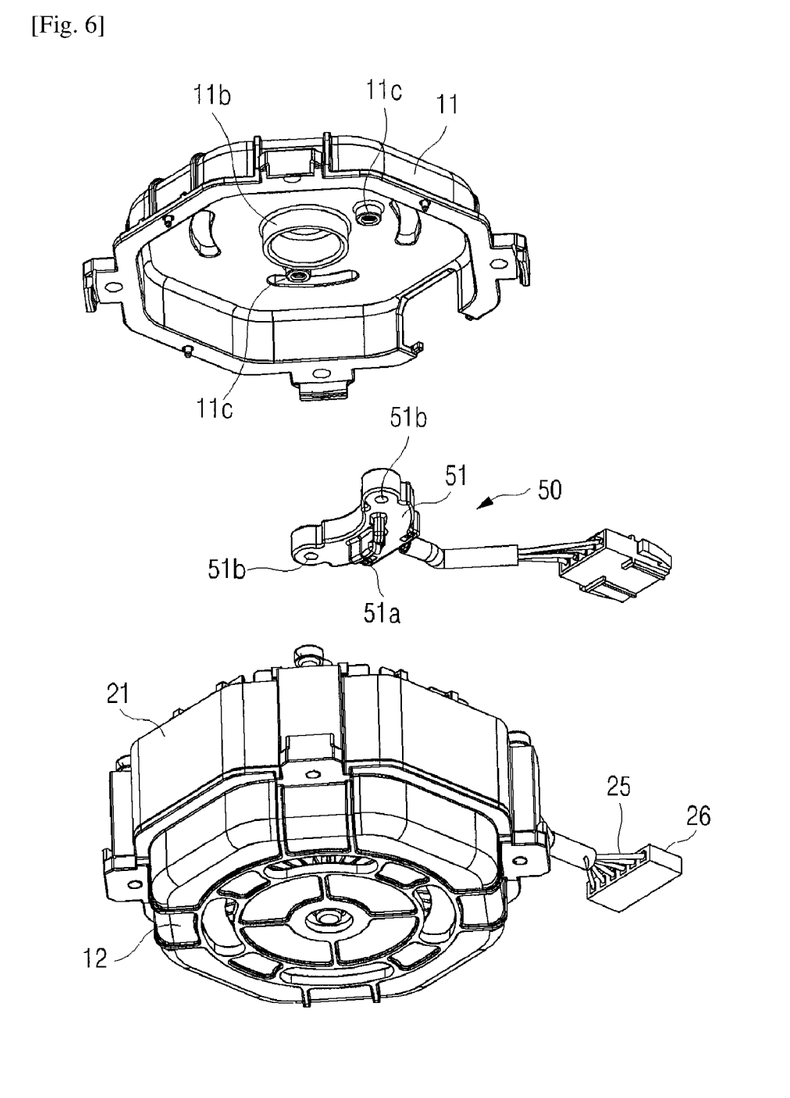
FIG. 6 is an exploded perspective view illustrating the upper housing and the hall sensor assembly of the switched reluctance motor according to the present invention.
Figure 7:
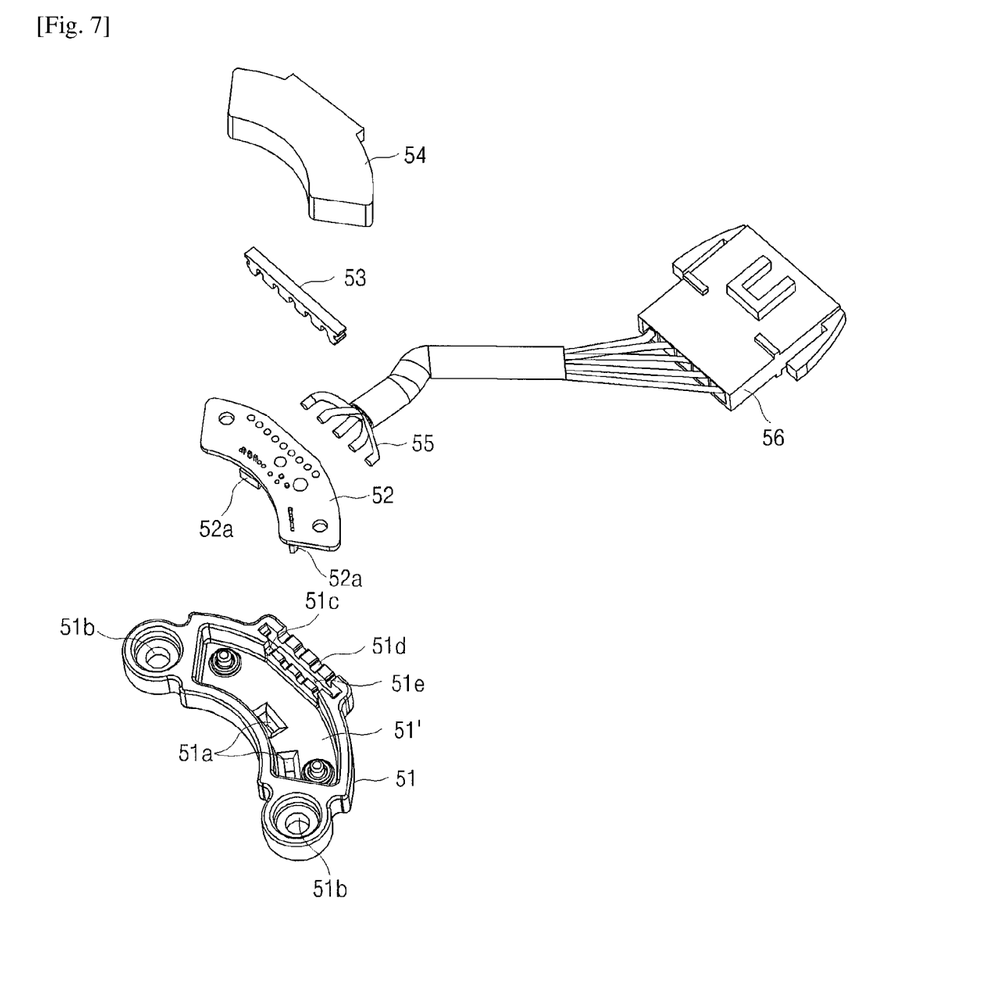
FIG. 7 is an exploded perspective view illustrating the hall sensor assembly of the switched reluctance motor according to the present invention.

FIG. 6 is an exploded perspective view illustrating the upper housing 11 and the hall sensor assembly 50 of the switched reluctance motor according to the present invention. FIG. 7 is an exploded perspective view illustrating the hall sensor assembly 50.

As illustrated in FIG. 6 and FIG. 7, the hall sensor assembly 50 of the present invention comprises a hall sensor case 51, a printed circuit board 52, a wire fixing member 53, a sealing material 54, a sensor lead wire 55, and a sensor connector 56.

The hall sensor case 51 is a case for receiving the printed circuit board 52 having a hall IC 52a installed therein. The printed circuit board 52 is received in a PCB insertion space 51', which is an inner space of the hall sensor case 51. The hall IC insertion part 51a is a part receiving the hall IC 52a installed in the printed circuit board 52, which is formed to protrude downwardly from a lower part of the hall sensor case 51. The inner space thereof is extended from the PCB insertion space 51'. A case fixing part 51b is formed at both sides of the hall sensor case 51. The hall sensor case 51 is coupled to a hall sensor case coupling part 11c formed at one side of the upper bearing insertion part 11b inside the upper housing 11. As a coupling method, the case fixing part 51b and the hall sensor case coupling part 11c may be coupled by various coupling means such as a bolt, a rivet, an indentation, a hook.

The hall IC 52a is downwardly installed in the printed circuit board 52. The number of hall IC 52a is not particularly limited, but preferably it corresponds to the number of motors. The sensor lead wire 55 is electrically connected to the printed circuit board 52. When the printed circuit board 52 is fixed to the inside of the hall sensor case 51, the sensor lead wire 55 is guided by a first guide groove 51c and a second guide groove 51d, to be withdrawn to the outside of the hall sensor case 51. An insertion space 51e is formed between the first guide groove 51c and the second guide groove 51d, and a wire fixing member 53 is inserted in the insertion space 51e. A third guide groove 53a is formed in the fixing member 53, so as to guide the sensor lead wire 55 and firmly fix the same between the first guide groove 51c and the second guide groove 51d. The sealing member 54 is a member for sealing by filling in the space remaining after the hall sensor case 51 receives the printed circuit board 52. Preferably, the sealing material is formed by injecting silicon molding. This prevents moisture from penetrating into the printed circuit board 52 or the hall IC 52a. The sensor connector 56 is connected to the other end of the sensor lead wire 55 so as to be electrically connected to an outside control circuit.

Figure 8:
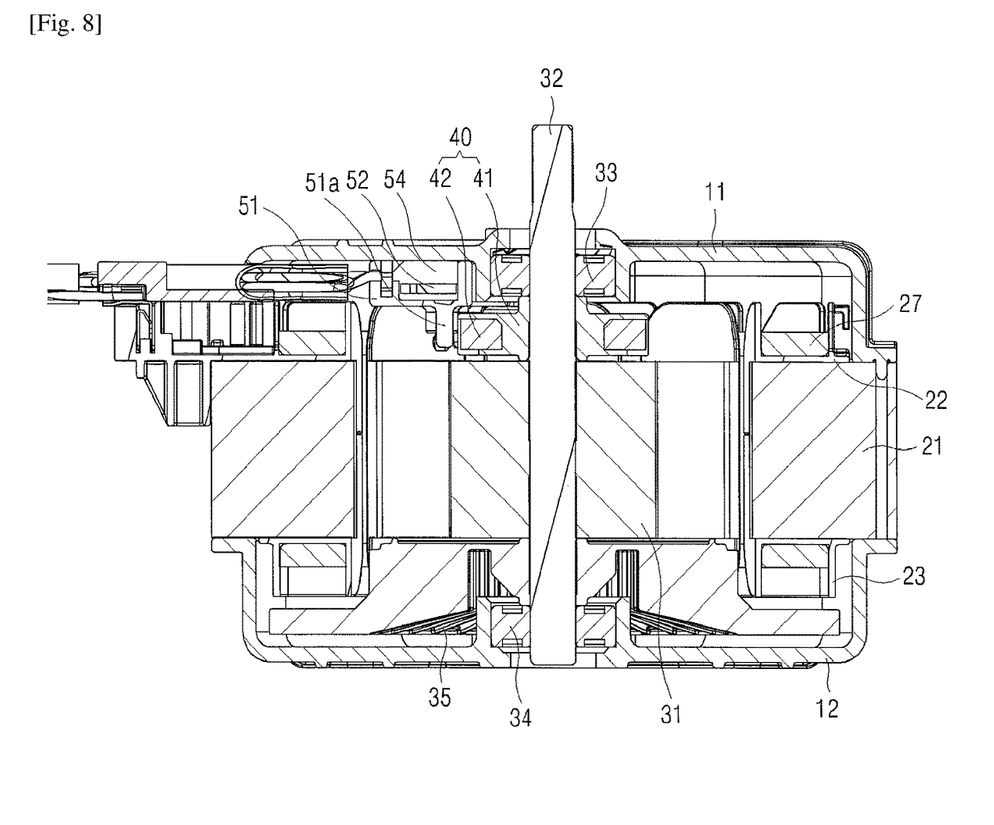
FIG. 8 is a cross-sectional view illustrating the switched reluctance motor according to the present invention.

FIG. 8 is a cross-sectional view illustrating the switched reluctance motor according to the present invention.

Referring to FIG. 8, the switched reluctance motor according to the present invention has the upper housing 11 coupled to an upper part of the stator core 21, and the lower housing 12 coupled to a lower part thereof. The upper insulator 22 is coupled to an upper part of the teeth protruding into the stator core 21, and the lower insulator 23 is coupled to a lower part thereof. The coil 27 is wound around the teeth part of the upper and lower insulators 22 and 23. The rotor core 31 is located in the direction of the shaft 32 from the teeth. The shaft 32 is penetratingly coupled in the center part of the rotor core 31. The rotation of the shaft 32 is supported by the upper and lower bearings 33 and 34. The sensor magnet assembly 40 is coupled to the shaft 32 between the upper bearing 33 and the rotor core 31 coupled to the shaft 32. The hall IC insertion part 51a of the hall sensor case 51 is placed at one side of the ring magnet 42 of the sensor magnet assembly 40 so as to sense the rotation of the rotor core 31 at the hall IC 52a. The hall sensor case 51 is installed at one side of the upper bearing 33 inside the upper housing 11.

The explanation in the present invention provided above is merely to provide examples to help understand the present invention, and is not intended to limit the scope of the present invention. The explanation in the present invention shall be defined by the accompanying claims, and it should be interpreted that simple modifications or alternations of the present invention made within the scope of the claims fall within the protection scope of the present invention.

The invention claimed is:

1. A switched reluctance motor, comprising:
    an upper housing (11);
    a stator assembly (20) comprising a stator core (21) coupled to the upper housing;
    a rotor assembly (30) located inside the stator assembly (20) and comprising a rotor core (31) rotating together with a shaft (32);
    a lower housing (12) coupled to a lower part of the stator core (21);
    a sensor magnet assembly (40) coupled to an upper part of the shaft (32) and rotating together with the shaft; and
    a hall sensor assembly (50) installed inside the upper housing (11) and installed at one side of the sensor magnet assembly (40),
    wherein the sensor magnet assembly (40) comprises:
        a mold cover (41) having a shaft coupling part (41a) coupled to the shaft (32); and
        a ring magnet (42) received in the mold cover (41),
    wherein, at an outer circumferential surface of the mold cover (41), the ring magnet (42) is formed in an axial longitudinal direction to be exposed to the outside, and a plurality of L-shaped open parts (41b) formed to be extended to the lower surface of the mold cover (41) is formed,
    wherein each of the plurality of L-shaped open parts has a structure for opening a part of side and lower surfaces of the ring magnet (42) to the mold cover (41) surrounding an entire of the ring magnet (42).

2. The switched reluctance motor of claim 1,
    wherein the hall sensor assembly (50) comprises a hall sensor case (51) receiving a printed circuit board (52),
    wherein a hall IC (52a) installed on the printed circuit board (52) is inserted in a hall IC insertion part (51a) formed to protrude to a lower part of the hall sensor case (51), and the hall IC insertion part (51a) is located at one side of the sensor magnet assembly (40).

3. The switched reluctance motor of claim 2, wherein the printed circuit board (52) received in the hall sensor case (51) is sealed by a sealing material (54).

\* \* \* \* \*